United States Patent
Roy

(10) Patent No.: US 11,050,069 B2
(45) Date of Patent: Jun. 29, 2021

(54) FUEL CELL COOLER PLATE

(71) Applicant: DOOSAN FUEL CELL AMERICA, INC., South Windsor, CT (US)

(72) Inventor: Donald J. L. Roy, Enfield, CT (US)

(73) Assignee: DOOSAN FUEL CELL AMERICA, INC., South Windsor, CT (US)

(*) Notice: Subject to any disclaimer, the term of this patent is extended or adjusted under 35 U.S.C. 154(b) by 134 days.

(21) Appl. No.: 16/548,053

(22) Filed: Aug. 22, 2019

(65) Prior Publication Data

US 2021/0057766 A1    Feb. 25, 2021

(51) Int. Cl.
| | |
|---|---|
| *H01M 8/04007* | (2016.01) |
| *H01M 8/0263* | (2016.01) |
| *H01M 8/0265* | (2016.01) |
| *H01M 8/04029* | (2016.01) |
| *H01M 8/2465* | (2016.01) |
| *H01M 8/0267* | (2016.01) |
| *F28F 3/02* | (2006.01) |
| *F28D 21/00* | (2006.01) |

(52) U.S. Cl.
CPC ........ *H01M 8/04074* (2013.01); *F28F 3/02* (2013.01); *H01M 8/0263* (2013.01); *H01M 8/0265* (2013.01); *H01M 8/0267* (2013.01); *H01M 8/04029* (2013.01); *H01M 8/2465* (2013.01); *F28D 2021/0043* (2013.01)

(58) Field of Classification Search
CPC ........ H01M 8/04074; H01M 8/0263; H01M 8/0265; H01M 8/04029; H01M 8/2465; H01M 8/0267
See application file for complete search history.

(56) References Cited

U.S. PATENT DOCUMENTS

| | | |
|---|---|---|
| 3,964,930 A | 6/1976 | Reiser |
| 4,583,583 A | 4/1986 | Inittel |
| 5,547,776 A | 8/1996 | Fletcher et al. |
| 6,050,331 A | 4/2000 | Breault et al. |
| 6,066,408 A | 5/2000 | Vitale et al. |
| 6,124,051 A | 9/2000 | Johnson |
| 6,432,566 B1 | 8/2002 | Condit et al. |
| 6,866,955 B2 | 3/2005 | Lee et al. |
| 6,905,792 B2 | 6/2005 | Imaseki et al. |
| 7,029,784 B2 | 4/2006 | Carlstrom |
| 7,585,581 B2 | 9/2009 | Kaye |
| 2003/0068541 A1 | 4/2003 | Sugiura et al. |

(Continued)

OTHER PUBLICATIONS

International Search Report and Written Opinion of the International Searching Authority for International Application No. PCT/US2020/044706 dated Oct. 27, 2020.

*Primary Examiner* — Stewart A Fraser
(74) *Attorney, Agent, or Firm* — Carlson, Gaskey & Olds

(57) ABSTRACT

An illustrative example fuel cell cooler plate includes a first side configured to be received adjacent a fuel cell component and a second side facing opposite the first side. The first side defines a first surface area of the plate. An edge is transverse to the first side and the second side. The edge has a surface area that is less than the first surface area. A first coolant passage within the plate is closer to the second side than the first side. A second coolant passage is between the first side and the first coolant passage. The second coolant passage is in a heat exchange relationship with the first coolant passage.

19 Claims, 3 Drawing Sheets

(56) References Cited

U.S. PATENT DOCUMENTS

| | | |
|---|---|---|
| 2004/0137298 A1 | 7/2004 | Sugiura et al. |
| 2006/0141312 A1 | 6/2006 | Fredley et al. |
| 2009/0239112 A1* | 9/2009 | Vanderwees ...... H01M 8/04067 |
| | | 429/429 |

* cited by examiner

FUEL CELL COOLER PLATE

BACKGROUND

Fuel cells generate electricity based on an electrochemical reaction. Fuel cell power plants typically include many fuel cells arranged in stacks referred to as cell stack assemblies. There are various challenges associated with operating a fuel cell power plant.

One challenge is regulating or controlling the temperature of the fuel cells. Proper operating temperatures are useful for maintaining sufficient amounts of liquid electrolyte, such as phosphoric acid, in the stack. Fuel cell coolers have been used to remove excess heat from the fuel cells. Such coolers are typically designed to cool the condensation zone near one edge of the cells to lower the exit temperature of gases from the stack. Maintaining proper temperatures in the condensation zone facilitates maintaining the liquid electrolyte within the stack.

Coolant temperatures that are useful in the condensation zone may be too low, however, for the active area of the cells. If the temperature of the active area is not high enough, the efficiency of the cell stack assembly decreases.

SUMMARY

An illustrative example fuel cell cooler plate includes a first side configured to be received adjacent a fuel cell component and a second side facing opposite the first side. The first side defines a first surface area of the plate. An edge is transverse to the first side and the second side. The edge has a surface area that is less than the first surface area. A first coolant passage within the plate is closer to the second side than the first side. A second coolant passage is between the first side and the first coolant passage. The second coolant passage is in a heat exchange relationship with the first coolant passage.

An embodiment having one or more features of the fuel cell cooler plate of the previous paragraph includes a third coolant passage between the second side and the first coolant passage. The second side is configured to be received adjacent a fuel cell component. The third coolant passage is in a heat exchange relationship with the first coolant passage.

In an embodiment having one or more features of the fuel cell cooler plate of any of the previous paragraphs, the first coolant passage has an inlet and an outlet. The first coolant passage is configured to carry coolant fluid from the inlet toward the outlet, the second coolant passage has an inlet configured to receive coolant fluid from the outlet of the first coolant passage, and the third coolant passage has an inlet configured to receive coolant fluid from the outlet of the first coolant passage.

In an embodiment having one or more features of the fuel cell cooler plate of any of the previous paragraphs, the first coolant passage, the second coolant passage and the third coolant passage are parallel to the first side.

An embodiment having one or more features of the fuel cell cooler plate of any of the previous paragraphs includes a first layer of plate material between the first coolant passage and the second coolant passage and a second layer of plate material between the first coolant passage and the third coolant passage. The first layer of plate material and the second layer of plate material are parallel to the first side and the second side.

An embodiment having one or more features of the fuel cell cooler plate of any of the previous paragraphs includes an inlet coolant passage upstream of the first coolant passage, the inlet coolant passage being configured to have a temperature that is lower than a temperature in at least a portion of the first coolant passage.

In an embodiment having one or more features of the fuel cell cooler plate of any of the previous paragraphs, the inlet coolant passage defines a serpentine path for coolant fluid to follow and at least one section of the serpentine path is open to an inlet of the first coolant passage.

In an embodiment having one or more features of the fuel cell cooler plate of any of the previous paragraphs, the inlet coolant passage is configured to be received adjacent a condensation zone of a fuel cell component and the second coolant passage is configured to be received adjacent an active zone of the fuel cell component.

In an embodiment having one or more features of the fuel cell cooler plate of any of the previous paragraphs, a first flow direction through the first coolant passage and a second, opposite flow direction through the second coolant passage establish a counter flow heat exchanger.

An illustrative example fuel cell cooler includes a plate having a width and a thickness, the width being greater than the thickness. The plate includes a plurality of coolant passages within the plate, the plurality of coolant passages being stacked along the thickness, a first one of the coolant passages being between a second one of the coolant passages and a third one of the coolant passages. The first one of the coolant passages is in a heat exchange relationship with each of the second one of the coolant passages and the third one of the coolant passages.

In an embodiment having one or more features of the fuel cell cooler of the previous paragraph, the plate comprises a first side and a second side facing opposite the first side. The thickness defines a spacing between the first side and the second side. The second one of the coolant passages is between the first side and the first one of the coolant passages. The third one of the coolant passages is between the second side and the first one of the coolant passages.

In an embodiment having one or more features of the fuel cell cooler of any of the previous paragraphs, the first one of the coolant passages has an inlet and an outlet. The first one of the coolant passages is configured to carry coolant fluid from the inlet toward the outlet. The second one of the coolant passages has an inlet configured to receive coolant fluid from the outlet of the first one of the coolant passages. The third one of the coolant passages has an inlet configured to receive coolant fluid from the outlet of the first one of the coolant passages.

In an embodiment having one or more features of the fuel cell cooler of any of the previous paragraphs, the plate includes a first layer of plate material between the first one of the coolant passages and the second one of the coolant passages, a second layer of plate material between the first one of the coolant passages and the third one of the coolant passages. The first layer of plate material and the second layer of plate material are parallel to the first side and the second side.

In an embodiment having one or more features of the fuel cell cooler of any of the previous paragraphs, the plurality of coolant passages includes an inlet coolant passage upstream of the first one of the coolant passages. The inlet coolant passage is configured to have a temperature that is lower than a temperature in at least a portion of the first one of the coolant passages. The inlet coolant passage is configured to be received adjacent a condensation zone of a fuel cell component. The second one of the coolant passages is configured to be received adjacent an active zone of the fuel cell component.

An illustrative example method of controlling a temperature of at least a portion of a fuel cell includes directing coolant fluid through a first coolant passage of a cooler plate, directing at least some of the coolant fluid from the first coolant passage through a second coolant passage of the cooler plate, absorbing heat from the portion of the fuel cell into the coolant fluid in the second coolant passage, and absorbing heat from the coolant fluid in the second coolant passage into the coolant fluid in the first coolant passage to thereby increase a temperature of the coolant fluid in the first coolant passage before the coolant fluid is directed through the second coolant passage.

An embodiment having one or more features of the method of the previous paragraph includes cooling an active region of the fuel cell using the coolant fluid in the second coolant passage and cooling a condensation region of the fuel cell using coolant fluid in an inlet passage that is upstream of the first coolant passage.

An embodiment having one or more features of the method of any of the previous paragraphs include directing at least some of the coolant fluid from the first coolant passage through a third coolant passage of the cooler plate, absorbing heat from the portion of the fuel cell into the coolant fluid in the third coolant passage, and absorbing heat from the coolant fluid in the third coolant passage into the coolant fluid in the first coolant passage to thereby increase the temperature of the coolant fluid in the first coolant passage before the coolant fluid is directed through the third coolant passage.

An embodiment having one or more features of the method of any of the previous paragraphs includes directing at least some of the coolant fluid from the first coolant passage through a third coolant passage of the cooler plate, absorbing heat from the portion of the fuel cell into the coolant fluid in the third coolant passage, and absorbing heat from the coolant fluid in the third coolant passage into the coolant fluid in the first coolant passage to thereby increase the temperature of the coolant fluid in the first coolant passage before the coolant fluid is directed through the third coolant passage.

An embodiment having one or more features of the method of any of the previous paragraphs includes directing the coolant fluid through the first coolant passage in a first direction and directing the coolant fluid through the second coolant passage in a second direction that is opposite to the first direction.

Various features and advantages of at least one disclosed example embodiment will become apparent to those skilled in the art from the following detailed description. The drawings that accompany the detailed description can be briefly described as follows.

DETAILED DESCRIPTION

Figure 1:
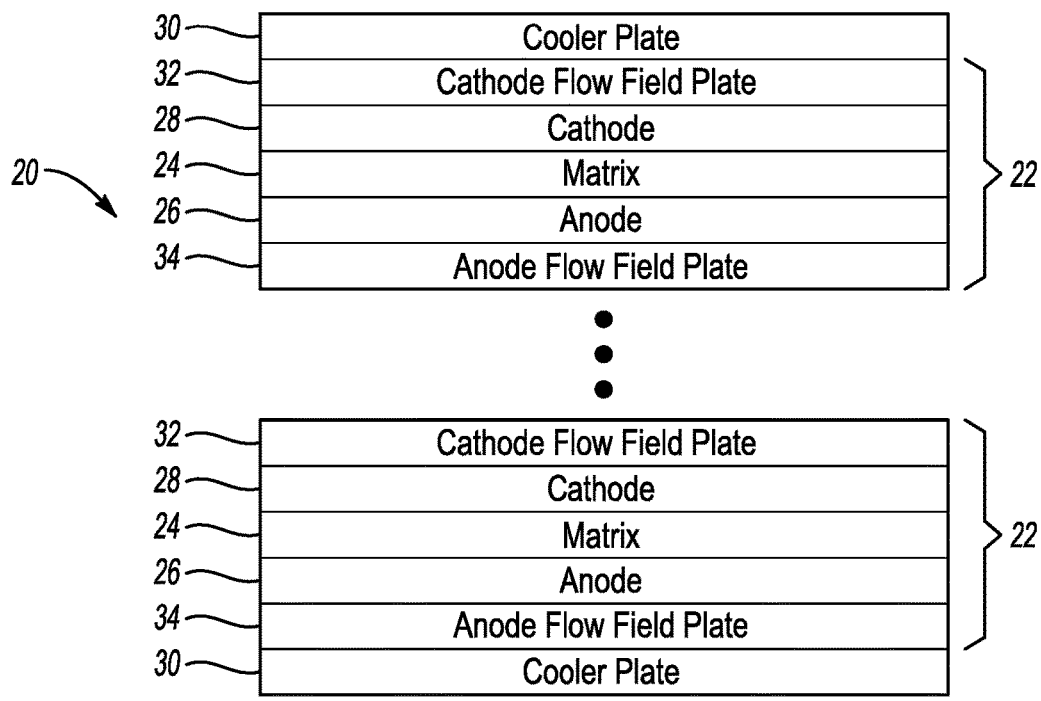
FIG. 1 schematically illustrates selected portions of a fuel cell stack assembly including cooler plates designed according to an example embodiment.
Figure 2:
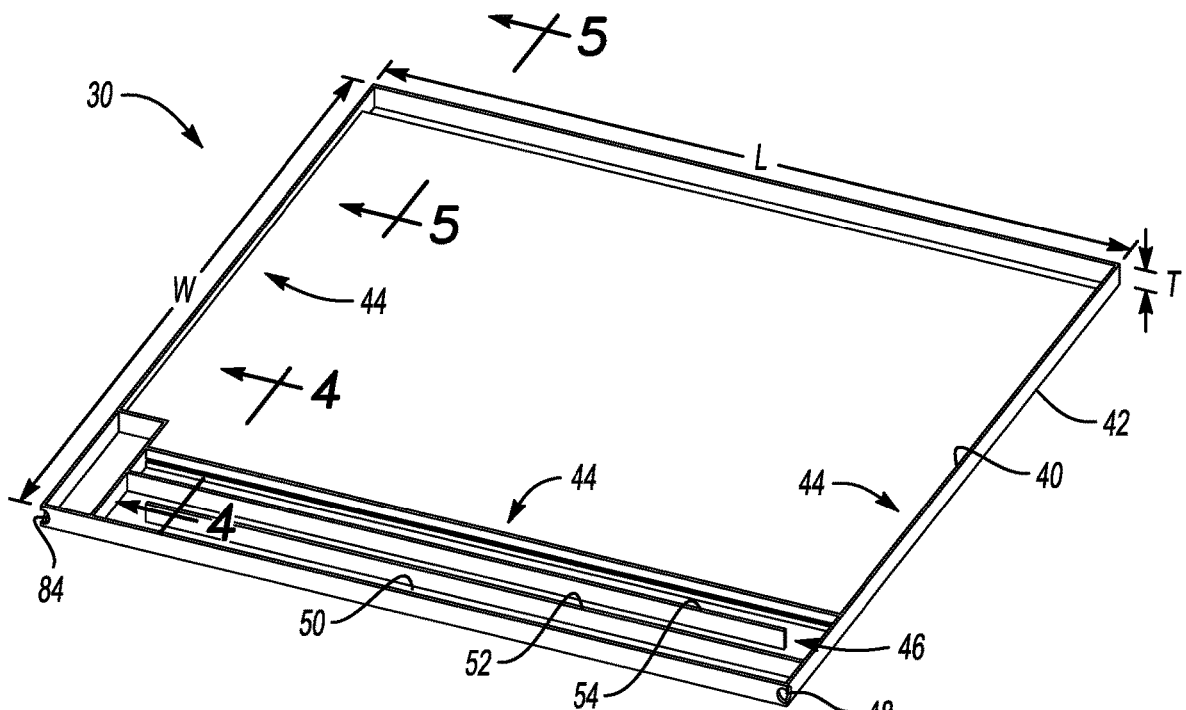
FIG. 2 diagrammatically illustrates selected features of an example embodiment of a fuel cell cooler plate.

FIG. 1 schematically illustrates selected features of a fuel cell stack assembly 20 including a plurality of fuel cells 22. Each fuel cell includes a matrix 24 containing a liquid electrolyte, such as phosphoric acid. An anode electrode 26 is on one side of the matrix 24 and a cathode electrode 28 is on an opposite side of the matrix 24. The cell stack assembly 20 includes a plurality of cooler plates 30. One of the cooler plates 30 is adjacent a cathode flow field plate 32 and another cooler plate 30 is adjacent an anode flow field plate 34. The cooler plates 30 include an arrangement of coolant passages that facilitates providing coolant at a sufficiently low temperature for the condensation zone of the fuel cells 22 and a sufficiently warm coolant temperature for the active region of the fuel cells. Only some of the fuel cells 22 and some of the cooler plates 30 of the cell stack assembly 20 are illustrated for discussion purposes and many embodiments will include more of such components.

FIGS. 2-5 show selected features of an example embodiment of a cooler plate 30. The illustrated cooler plate 30 has a first side 40 and an oppositely facing side 42. The first side 40 has a length L and a width W that is the same as the length and width of the second side 42. Edges of the cooler plate 30 have a thickness T in a direction that is transverse to the first side and the second side. A surface area of the edges is less than the surface area of the first side 40.

The cooler plate 30 includes a section 44 that is configured to be received adjacent an active region of an adjacent fuel cell component. The active region is that portion of the fuel cell that is involved in the electrochemical process for generating electricity. The cooler plate 30 also includes a section 46 that is configured to be aligned with the condensation zone of an adjacent fuel cell component.

A layer of cooler plate material on the first side 40 is not shown in FIGS. 2-5 for purposes of illustrating operative features of the cooler plate 30. The cooler plate 30 includes coolant passages that allow coolant fluid to flow in a manner that is useful for absorbing heat from adjacent or nearby fuel cell components. An inlet 48 is configured to receive coolant fluid into the section 46 that is configured for cooling the condensation zone of at least an adjacent fuel cell component. An inlet flow passage 50 is defined, in part, by ribs 52 and 54 that establish a serpentine pathway for coolant fluid within the section 46. The coolant fluid entering the inlet 48 has a low temperature that is useful for providing the level of cooling needed for the condensation zones of the fuel cells 22 within the cell stack assembly 20. The coolant fluid follows a path indicated by the arrows 56 and then arrows 58, which indicate coolant fluid flow into an inlet 60 of a first flow passage 62 (FIGS. 4 and 5) situated within the section 44 of the coolant plate 30.

Figure 4:
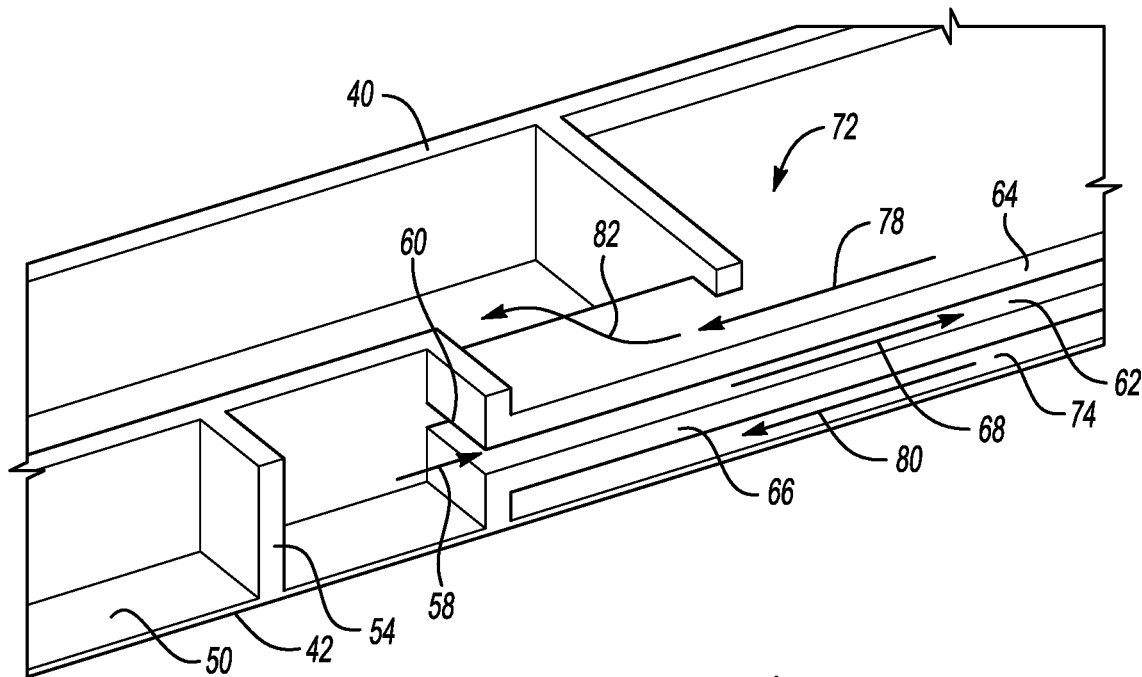
FIG. 4 is a sectional view taken along the lines 4-4 in FIG. 2.
Figure 5:
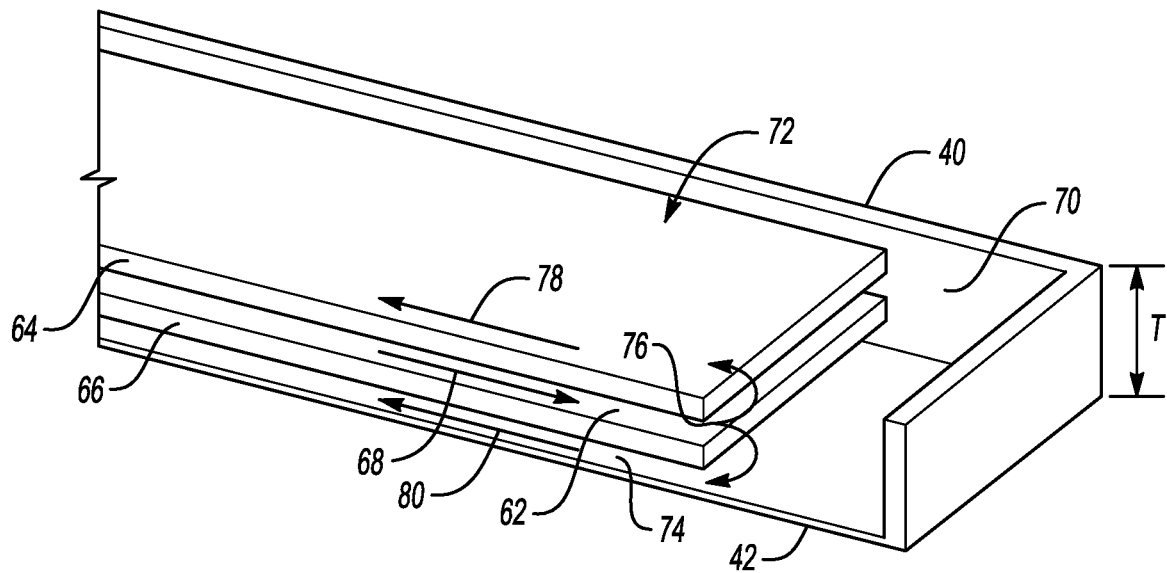
FIG. 5 is a sectional view taken along the lines 5-5 in FIG. 2.

As best appreciated from FIGS. 4 and 5, the first coolant passage 62 is defined between layers 64 and 66 of coolant plate material. The layers 64 and 66 and the first coolant passage 62 between them are all parallel to the first side 40. The first coolant passage 62 in this example embodiment is co-extensive with the section 44 of the coolant plate 30. The first coolant passage 62 allows for coolant flow as schematically represented by the arrow 68 in a first direction.

The first coolant passage 62 includes an outlet 70 at an opposite end from the inlet 60. Coolant fluid exiting the outlet 70 flows into a second coolant passage 72 and a third coolant passage 74 as schematically represented by the arrows 76. Coolant fluid flows in the second coolant passage 72 in a direction represented by the arrow 78 and through the third coolant passage 74 in the direction represented by the arrow 80.

The second coolant passage 70 is between the first side 40 of the cooler plate 30 and the first coolant passage 62. The third coolant passage 74 is between the first coolant passage 62 and the second side 42 of the coolant plate 30. Each of the first coolant passage 62, second coolant passage 72 and third coolant passage 74 are parallel to the first side 40 of the cooler plate 30. The first coolant passage 62, second coolant passage 72 and third coolant passage 74 are stacked in the thickness direction of the cooler plate 30.

Figure 3:
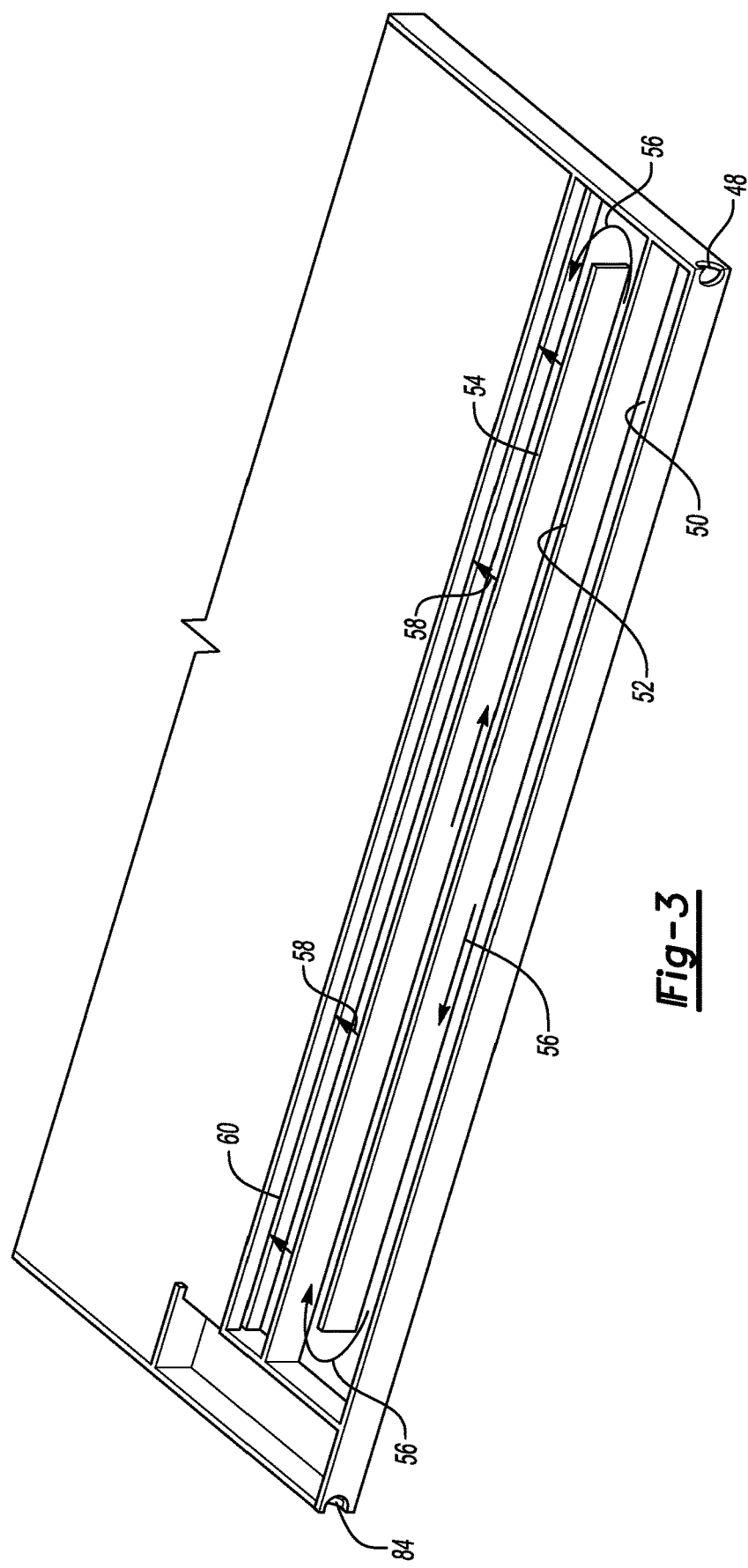
FIG. 3 diagrammatically illustrates selected features of the embodiment of FIG. 2 in somewhat more detail.

The opposite directions of flow in the first coolant passage 62 and the second coolant passage 72 define a cross-flow heat exchange relationship between those two coolant passages. Similarly, the opposite directions of flow 68 and 80 through the first coolant passage 62 and the third coolant passage 74, respectively, define a cross-flow heat exchange relationship between those flow passages. Coolant fluid exits the second coolant passage 72 and the third coolant passage 74 as schematically shown by the arrow 82 (FIG. 4) and leaves the coolant plate 30 through an outlet 84 (FIG. 3).

The heat exchange relationship between the first coolant passage 62 and the second coolant passage 72 allows for the coolant fluid to enter the inlet 60 of the first coolant passage 62 at a first temperature and to absorb heat from the second coolant passage 72 before that coolant fluid reaches and exits the outlet 70 of the first coolant passage 62. Similarly, coolant fluid within the first coolant passage 62 can absorb heat from the third coolant passage 74 as that coolant fluid flows through the first coolant passage 62. Warming or pre-heating the coolant fluid within the first coolant passage 62 utilizing heat from the second coolant passage 72 and the third coolant passage 74 increases the temperature of the coolant fluid before it is utilized for absorbing heat from the active regions of adjacent fuel cell components. The heat exchange relationship between the coolant flow passages 62, 72, 74, therefore, allows for providing sufficiently low coolant temperatures for cooling a condensation zone and sufficiently warm coolant temperatures for cooling the active region of fuel cells within the cell stack assembly 20.

In operation the coolant passages 62 and 72 allow for directing coolant fluid through the first coolant passage 62 and directing at least some of the fluid from the first coolant passage 62 through the second coolant passage 72. The coolant fluid in the second coolant passage 72 absorbs heat from an active region of at least one adjacent fuel cell and the coolant fluid in the first passage 62 absorbs heat from the coolant fluid in the second coolant passage 72. The heat absorbed into the first coolant passage 62 increases the temperature of the coolant fluid in that passage before that coolant fluid is directed through the second coolant passage 72. A condensation region of at least one nearby or adjacent fuel cell is cooled using the coolant fluid in the inlet passage 50, which is upstream of the first coolant passage 62.

The illustrated example embodiment of a cooler plate facilitates extending the useful life of a fuel cell power plant and increases fuel cell efficiency by providing cooling at sufficiently low coolant fluid temperatures for the condensation zone of a fuel cell and sufficiently warm coolant fluid temperatures for the active region of a fuel cell. The lower condensation zone coolant temperature sufficiently cools exit gas temperatures to better maintain liquid electrolyte in the fuel cell. The warmer active region coolant temperature avoids over-cooling the active region while still providing cooling so that the active region temperature can be better maintained in a range associated with efficient fuel cell operation.

The preceding description is exemplary rather than limiting in nature.

Variations and modifications to the disclosed examples may become apparent to those skilled in the art that do not necessarily depart from the essence of this invention. The scope of legal protection given to this invention can only be determined by studying the following claims.

I claim:

1. A fuel cell cooler plate, comprising:
    a first side configured to be received adjacent a fuel cell component, the first side defining a first surface area of the plate;
    a second side facing opposite the first side;
    an edge that is transverse to the first side and the second side, the edge having a surface area that is less than the first surface area;
    a first coolant passage within the plate that is closer to the second side than the first side; and
    a second coolant passage between the first side and the first coolant passage, the second coolant passage being in a heat exchange relationship with the first coolant passage.

2. The fuel cell cooler plate of claim 1, comprising a third coolant passage between the second side and the first coolant passage,
    wherein
    the second side is configured to be received adjacent a fuel cell component and
    the third coolant passage is in a heat exchange relationship with the first coolant passage.

3. The fuel cell cooler plate of claim 2, wherein
    the first coolant passage has an inlet and an outlet;
    the first coolant passage is configured to carry coolant fluid from the inlet toward the outlet;
    the second coolant passage has an inlet configured to receive coolant fluid from the outlet of the first coolant passage; and
    the third coolant passage has an inlet configured to receive coolant fluid from the outlet of the first coolant passage.

4. The fuel cell cooler plate of claim 2, wherein the first coolant passage, the second coolant passage and the third coolant passage are parallel to the first side.

5. The fuel cell cooler plate of claim 4, comprising
    a first layer of plate material between the first coolant passage and the second coolant passage;
    a second layer of plate material between the first coolant passage and the third coolant passage; and
    wherein the first layer of plate material and the second layer of plate material are parallel to the first side and the second side.

6. The fuel cell cooler plate of claim 1, comprising an inlet coolant passage upstream of the first coolant passage, the inlet coolant passage being configured to have a temperature that is lower than a temperature in at least a portion of the first coolant passage.

7. The fuel cell cooler plate of claim 6, wherein
    the inlet coolant passage defines a serpentine path for coolant fluid to follow; and
    at least one section of the serpentine path is open to an inlet of the first coolant passage.

8. The fuel cell cooler plate of claim 6, wherein
    the inlet coolant passage is configured to be received adjacent a condensation zone of a fuel cell component; and the second coolant passage is configured to be received adjacent an active zone of the fuel cell component.

9. The fuel cell cooler plate of claim 1, wherein a first flow direction through the first coolant passage and a second, opposite flow direction through the second coolant passage establish a counter flow heat exchanger.

10. A fuel cell cooler comprising a plate having a width and a thickness, the width being greater than the thickness, the plate including a plurality of coolant passages within the plate, the plurality of coolant passages being stacked along the thickness, a first one of the coolant passages being between a second one of the coolant passages and a third one of the coolant passages, wherein the first one of the coolant passages is in a heat exchange relationship with each of the second one of the coolant passages and the third one of the coolant passages.

11. The fuel cell cooler of claim 10, wherein
the plate comprises a first side and a second side facing opposite the first side;
the thickness defines a spacing between the first side and the second side;
the second one of the coolant passages is between the first side and the first one of the coolant passages;
the third one of the coolant passages is between the second side and the first one of the coolant passages.

12. The fuel cell cooler of claim 10, wherein
the first one of the coolant passages has an inlet and an outlet;
the first one of the coolant passages is configured to carry coolant fluid from the inlet toward the outlet;
the second one of the coolant passages has an inlet configured to receive coolant fluid from the outlet of the first one of the coolant passages; and
the third one of the coolant passages has an inlet configured to receive coolant fluid from the outlet of the first one of the coolant passages.

13. The fuel cell cooler of claim 10, wherein the plate includes
a first layer of plate material between the first one of the coolant passages and the second one of the coolant passages;
a second layer of plate material between the first one of the coolant passages and the third one of the coolant passages; and
the first layer of plate material and the second layer of plate material are parallel to a first side and a second side.

14. The fuel cell cooler of claim 10, wherein
the plurality of coolant passages includes an inlet coolant passage upstream of the first one of the coolant passages;
the inlet coolant passage is configured to have a temperature that is lower than a temperature in at least a portion of the first one of the coolant passages;
the inlet coolant passage is configured to be received adjacent a condensation zone of a fuel cell component; and
the second one of the coolant passages is configured to be received adjacent an active zone of the fuel cell component.

15. A method of controlling a temperature of at least a portion of a fuel cell, the method comprising:
directing coolant fluid through a first coolant passage of a cooler plate;
directing at least some of the coolant fluid from the first coolant passage through a second coolant passage of the cooler plate;
absorbing heat from the portion of the fuel cell into the coolant fluid in the second coolant passage; and
absorbing heat from the coolant fluid in the second coolant passage into the coolant fluid in the first coolant passage to thereby increase a temperature of the coolant fluid in the first coolant passage before the coolant fluid is directed through the second coolant passage.

16. The method of claim 15, comprising
cooling an active region of the fuel cell using the coolant fluid in the second coolant passage; and
cooling a condensation region of the fuel cell using coolant fluid in an inlet passage that is upstream of the first coolant passage.

17. The method of claim 15, comprising
directing at least some of the coolant fluid from the first coolant passage through a third coolant passage of the cooler plate;
absorbing heat from the portion of the fuel cell into the coolant fluid in the third coolant passage; and
absorbing heat from the coolant fluid in the third coolant passage into the coolant fluid in the first coolant passage to thereby increase the temperature of the coolant fluid in the first coolant passage before the coolant fluid is directed through the third coolant passage.

18. The method of claim 17, wherein
the cooler plate has a thickness;
the first coolant passage, second coolant passage, and the third coolant passage are stacked along the thickness; and
the first coolant passage is between the second coolant passage and the third coolant passage.

19. The method of claim 15, comprising
directing the coolant fluid through the first coolant passage in a first direction; and
directing the coolant fluid through the second coolant passage in a second direction that is opposite to the first direction.

* * * * *